Patented June 9, 1953

2,641,612

UNITED STATES PATENT OFFICE 2,641,612

VANILLIC ACID DIETHYLAMIDE

Karl Kratzl and Erich Kvasnicka, Vienna, Austria, assignors to Osterreichische Stickstoffwerke Aktiengesellschaft, Linz (Donau), Austria No Drawing. Application July 7, 1950, Serial No. 172,614. In Austria July 15, 1949

1 Claim. (Cl. 260—559)

It is well known that certain di-substituted amides of organic acids possess pharmacological properties which make them appear to be very suitable as therapeutic agents, particularly as respiratory and circulatory media, for example a nicotinic acid diethyl amide.

Amongst the di-substituted amides of the arylcarboxylic acids and their core-substituted derivatives there is however also a class of compounds having an entirely similar action. Benzoic acid dialkylamides and their monoalkoxy derivatives already exhibit a stimulating action on the respiration and circulation. It was subsequently found that this action can be increased either by introduction of another carboxylic group (French patent specification No. 785,428, U. S. patent specification No. 2,137,279) or by the introduction of further alkoxy groups into the nucleus (German patent specification No. 608,412).

An unexpected and very intense further increase of the activity has now been found in the hitherto unknown disubstituted amide, vanillic acid diethylamide which in addition to a free phenolic hydroxyl group also contain alkoxyl groups in the aryl nucleus. This increase of activity was not to be foreseen, since both the benzoic acid amides substituted by alkoxyl groups alone and those substituted by phenolic hydroxyl groups alone possess only low activity.

This hitherto unknown combination of substituents has rendered it possible to produce compounds which have shown a pronounced analeptic activity both on autonomous and on cortical functions, within a dosage range which makes these substances belong to the strongest synthetic analeptics so far known. Apart from the good respiratory effect, an intense increase of blood pressure should be particularly stressed, which exceeds that of hitherto known synthetic analeptics in intensity and duration.

An object of the invention is the production of an analeptic compound of high activity, vanillic acid diethylamide. The new analeptic compound is prepared by converting vanillic acid into its diethylamide by heating it with diethylamine in the presence of a dehydrating agent.

Example 4 g. of vanillinic acid are mixed with 3.6 g. of diethylamine, after cooling 2.2 g. of phosphorus pentoxide and the same amount of glass powder are added, and then reacted with xylene until a thin paste has been formed. The latter is boiled for some hours in the reflux cooler, moisture being excluded. Decantation follows, and the residue is dissolved by means of a warm solution of potassium carbonate until only glass powder or small amounts of impurities remain undissolved, and then the xylene solution is shaken up therewith. The xylene solution is then separated, the aqueous layer is again extracted with ether, and the ether extract is combined with the xylene solution. The mixture is then distilled under the lowest possible pressure, collecting the fraction between 170° and 250° (referred to 10 Torr), and purifying it by further fractionation. In this way a slightly yellowish oil is obtained, which crystallises after some time. By dissolving in ligroin and crystallising, pure vanillinic acid diethylamide is obtained in the form of white needles; M. P. 95° to 95.5°.

What we claim is:

An analeptic compound consisting of vanillic acid diethylamide, which has a very marked action on the respiratory center and on blood pressure.

KARL KRATZL.
ERICH KVASNICKA.

References Cited in the file of this patent

UNITED STATES PATENTS

| Number | Name | Date |
|---|---|---|
| 1,939,496 | Guggenheim | Dec. 12, 1933 |
| 2,312,004 | Schneider et al. | Feb. 23, 1943 |

OTHER REFERENCES

Couturier et al.: "Comptes Rendus," vol. 205 (1937), pp. 800 to 802.

Couturier et al.: "Annales de Chemie," series 11, vol. 10 (1938), pp. 569 to 579, 601 and 604.